Nov. 13, 1951 — L. G. SAYWELL — 2,575,132
SEALING ASSEMBLY
Filed Sept. 6, 1947
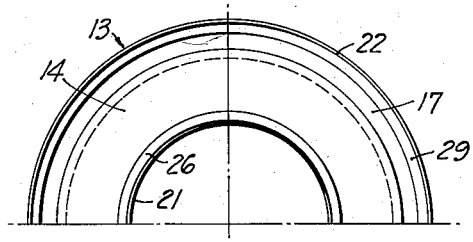
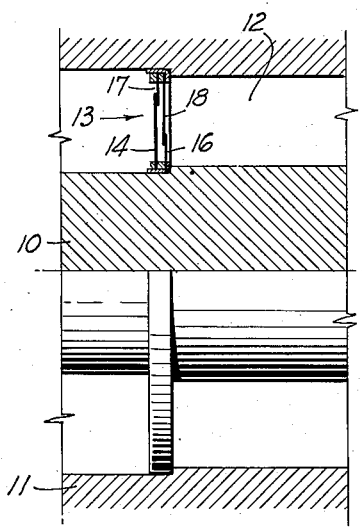
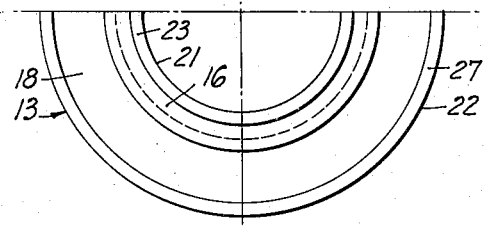
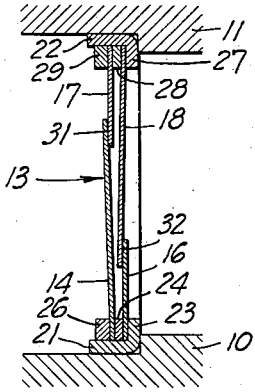
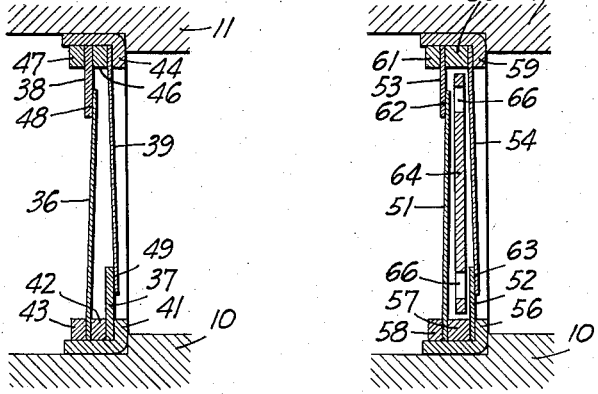
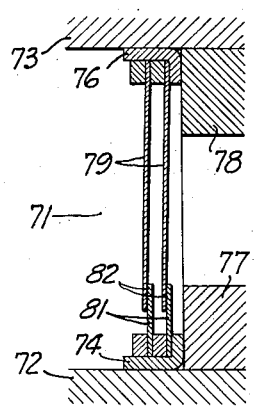
INVENTOR
Lawrence G. Saywell
BY
Flehr & Swain
ATTORNEYS Patented Nov. 13, 1951

2,575,132

UNITED STATES PATENT OFFICE 2,575,132

SEALING ASSEMBLY

Lawrence G. Saywell, San Mateo, Calif., assignor to Saywell Associates, South San Francisco, Calif., a joint venture Application September 6, 1947, Serial No. 772,483

5 Claims. (Cl. 277—42)

This invention relates generally to devices intended to be inserted into an annular space between outer and inner concentric parts to provide a fluid tight seal.

In providing a seal between inner and outer concentric parts, it is frequently necessary to withstand considerable fluid pressure. For example bearings adapted to be submerged in water should be provided with sealing means capable of preventing oil leakage and preventing entrance of water when submerged. Conventional engineering practice in the past has been to use various types of packing glands for such requirements. However, conventional packing glands have many undesirable characteristics, including considerable friction to rotation and the necessity of continual adjustment.

As applied to rotating shafts a great many so-called bearing seals have been used to prevent loss of lubricating oil or grease. One such arrangement is disclosed and claimed in my co-pending application Serial No. 618,729, filed September 26, 1945, now Patent No. 2,428,041, dated September 30, 1947. The device in that instance comprises inner and outer structures having elements in overlapping relation, thereby providing a plurality of engaged annular sealing areas. In general however such bearing seals are designed primarily to retain the oil or grease of a bearing, and do not provide for relieving abnormal oil pressure.

It is an object of the present invention to provide a novel device for sealing between inner and outer concentric parts which will withstand substantial fluid pressure applied to one side of the device, and permit escape of fluid such as a lubricant applied to the other side of the device when the pressure of the same is abnormal.

Another object of the invention is to provide a bearing seal which will facilitate flushing the bearing with grease or like lubricant, without injury to the sealing device.

Another object of the invention is to provide an improved sealing device of the type disclosed and claimed in my co-pending application Serial No. 618,729, and which has novel characteristics with respect to resisting external fluid pressures.

Additional objects of the invention will appear from the following description in which the preferred embodiments have been set forth in detail in conjunction with the accompanying drawing.

Referring to the drawing:

Figure 1 is a side elevational view, partly in section, showing a device made in accordance with the present invention applied to seal between inner and outer concentric parts.

Figure 2 is an enlarged sectional detail to illustrate the construction of the seal incorporated in Figure 1.

Figure 3 is a half-side view of the sealing device incorporated in Figure 1, and looking toward the right.

Figure 4 is likewise a half-side view of the device, but looking toward the left as viewed in Figure 1.

Figure 5 is a view like Figure 2 but illustrating another embodiment of the device.

Figure 6 is a view like Figure 2 and illustrating a further embodiment.

Figure 7 is a view like Figure 2 and illustrating another embodiment.

In Figure 1 there is shown a shaft 10 or like inner part which is concentric with respect to the outer part 11. The annular space between these parts is sealed by the assembly or device 13.

In that form of the device 13 illustrated in Figures 2 to 4 inclusive, inner and outer structures are provided which include elements in overlapping and sealing relation. The inner structure includes the annuluses 14 and 16, and the outer structure the annuluses 17 and 18. In that form of the invention being described all of the annuluses are formed of relatively thin flexible sheet metal. For example they can be formed of suitable spring metal or metal alloys such as high carbon steel, phosphor bronze, or one or more of the so-called stainless steels. The thickness of these annuluses may, for example, be of the order of 0.003 inch.

The inner annuluses 14 and 16 are carried by the mounting ring 21 and the outer annuluses by the ring 22. Ring 21 is provided with a flange or shoulder 23 on which the parts are assembled. The inner peripheries of the annuluses 14 and 16 are separated by the spacer ring 24, and a retaining ring 26 having a press fit upon the ring 21, serves to retain the parts in assembled relation. Ring 22 similarly has a shoulder 27, and the parts are assembled together with the spacer ring 28, and the retaining ring 29. Rings 21 and 22 are proportioned to have a press or force fluid tight fit on the shaft and within the bore of the housing and in their final positioning it is desirable that they abut locating shoulders disposed in a common plane.

The annuluses are proportioned whereby annuluses 14 and 17 overlap on the sealing areas 31, and annuluses 16 and 18 overlap on the sealing areas 32. The proportioning of the mounting for the annuluses is such that when assembled the annuluses are sprung or stressed laterally, to urge the overlapping portions together with a predetermined amount of pressure. This is what can be termed a preloading of the sealing areas, as explained in my aforesaid application.

It will be noted that the proportioning is such that the sealing area 32 is of a radius considerably less than the radius of sealing area 31. Actually the proportioning of the annuluses is such that when viewing the parts from the left as in Figure 2, the exposed effective fluid pressure area of annulus 14, extending inwardly of the area 31, is considerably more than the fluid pressure area presented by the annulus 17. As viewed from the right however the effective fluid pressure area presented by annulus 18 is considerably greater than the effective fluid pressure area presented by annulus 16. This relationship can be better understood by reference to Figures 3 and 4.

Assuming that my device is installed to seal about a rotating shaft at a point adjacent a bearing, the bearing for example would be on the right side of the seal as illustrated in Figure 2. It may be assumed that the left side is exposed to fluid pressure which may considerably exceed atmospheric. With a reasonable and adequate degree of loading between the areas 31 and 32, these areas will effectively serve to prevent leakage of oil from the right hand side of the device. A considerable fluid pressure may be exerted upon the left hand side of the device without permitting leakage of fluid into the bearing. Actually as fluid pressure is applied to the left hand side of the device, the loading upon the sealing area 31 will be increased, because annulus 14 presents a greater effective fluid pressure area than the annulus 17. Therefore the device will withstand fluid pressure applied to the left hand side until mechanical failure occurs. Assuming however that temporary excessive or abnormal pressure is applied to the right hand side of the device, due for example to application of excessive oil or grease to the bearing, the loading upon the sealing area 32 is reduced, and sufficient pressure will cause the overlapping surfaces forming this area to be separated. This is because the annulus 18 has considerably greater effective fluid pressure area than the annulus 16. The fluid thus finding its way between the annuluses 14 and 17 applies pressure to the right hand side of the larger annulus 14, and as a result annuluses 14 and 17 are likewise separated to permit the escape of fluid. Thus it is evident that the device just described is capable of withstanding considerable pressure upon one side of the same but will relieve fluid pressure applied from the other side, when this pressure exceeds a value sufficient to separate the overlapping portions of the annuluses. When using the device with a bearing it is evident that such excessive fluid pressure may occasionally be applied to the device, particularly when oil or grease is applied by a pressure lubricating device. If no adequate means were provided for permitting the relief of such excessive pressure, the sealing device might be injured. With my invention grease or like lubricant can be supplied to the bearing in such amount as to flush the bearing, without injury to the seal.

In the embodiment of the invention illustrated in Figure 5 the inner structure includes the annuluses 36 and 37, and the outer structure includes the annuluses 38 and 39. Annuluses 36 and 37 are assembled upon the mounting ring 41 together with the spacer ring 42, and the retaining ring 43. Annuluses 38 and 39 are likewise assembled upon the mounting ring 44, together with the spacer ring 46, and the retaining ring 47. The annuluses have overlapping portions forming sealing areas 48 and 49, which are preloaded to form the desired seal. In this instance the annuluses 37 and 38 are made of relatively rigid material, while the annuluses 36 and 39 are made of relatively flexible spring metal. With the overlapping portions being arranged as illustrated in Figure 5, fluid pressure will be resisted when applied to the right hand side of the assembly, and when applied to the left hand side the overlapping portions will tend to be separated, thus permitting the relief of pressure.

The embodiment of the device illustrated in Figure 6 is in some respects similar to Figure 2, but additional means is provided to aid resisting higher fluid pressures. Thus in this instance the inner structure includes the annuluses 51 and 52 corresponding to the annuluses 14 and 16, and which cooperate with the annuluses 53 and 54 of the outer structure. The inner structure also includes the mounting rings 56, spacer ring 57 and retaining ring 58. The outer structure similarly includes the mounting ring 59, spacer ring 60 and retaining ring 61. The sealing areas 62 and 63 are formed in substantially the same manner as in Figure 1. Loosely disposed between the cooperating annuluses, there is a relatively rigid annular member 64. Normally this member does not interfere with flow of fluid through the seal because of its relatively rough surface. However, apertures 66 can be provided to insure flow of fluid in one direction.

It will be evident that the device of Figure 6 is capable of withstanding considerably higher fluid pressures. When pressure is applied to the right hand side of this device the annuluses 52 and 54 are flexed to the left until reinforced by engagement with the stiffening member 64. However, when fluid pressure is applied to the left hand side of the device, the overlapping portions are caused to be separated, thus permitting the venting of fluid through the device, and about the member 64, or through the apertures 66 provided in the same.

Figure 7 shows another embodiment of the invention in which the annular sealing areas may be of the same diameter. In this instance the sealing assembly is mounted within the annular recess 71 formed between the shaft 72 and the housing 73. The mounting rings 74 and 76 of the assembly are positioned in abutting relationship with the end shoulders of the ballbearing races 77 and 78.

The outer structure of the assembly includes the thin metal annuluses 79 which are substantially the same diameter. The inner structure includes the annuluses 81 which are likewise of the same diameter and which have their outer peripheral edges in overlapping sealing contact with the inner peripheral edges of annuluses 79, thus forming the annular sealing areas 82. The mounting of the annuluses is such that when positioned as illustrated a certain amount of offsetting is applied in a direction longitudinally of the shaft axis, thereby laterally stressing the annuluses and urging the interleaved edge portions in sealing engagement. Such offsetting can be increased by relative proportioning of rings 74 and 76 or by the use of a spacer between the flange on ring 74 and the adjacent one of annuluses 81.

Normally the assembly of Figure 7 serves to prevent leakage of oil from the bearing. However, if excessive oil or grease pressure is applied the pressure of the same upon the larger annuluses the sealing areas 82 to be separated, thus permitting the relief of abnormal pressure together with flushing of the bearing. Fluid pressure against the left hand side of the assembly urges the overlapping portions into tighter engagement and thus such pressure is resisted to the point of mechanical failure.

It is evident that my sealing assembly has many uses in various machines and mechanical appliances. It is particularly useful in the sealing of bearings which may be submerged in water. It is desirable to seal such bearings in such a manner that the seal will vent lubricant in the event abnormal pressure is applied during lubrication. At the same time the seal should be such as to effectively resist external fluid pressure during submersion, thus preventing water or like liquid from entering the bearing.

I claim:

1. A sealing device for establishing a fluid tight seal between relatively rotatable inner and outer parts having an annular space therebetween for receiving said sealing device, said sealing device comprising an outer sealing structure adapted to be carried by said outer part in fluid tight relation therewith and extending radially inwardly into said space, an inner sealing structure adapted to be carried by said inner part in fluid tight relation therewith and extending radially outwardly into said space, each of said structures including at least two annular sealing elements, each element of one structure having overlapping and sealing engagement with a sealing element of the other structure, the overlapping sealing area on one side of the assembly being on such a radius that the exterior face of the corresponding inner element presents an effective fluid pressure area substantially greater than the effective fluid pressure area presented by the exterior face of the engaged outer element, and the sealing area on the other side of the assembly being on such a radius that the effective fluid pressure area presented by the exposed exterior face of the corresponding outer element is substantially greater than the exterior face of the corresponding inner element, each of the elements which present the greater fluid pressure areas being stressed in the same direction longitudinally of the axis of the device.

2. A sealing device for establishing a fluid tight seal between relatively rotatable inner and outer parts having an annular space therebetween for receiving said sealing device, said sealing device comprising an outer sealing structure adapted to be carried by said outer part in fluid tight relation therewith and extending radially inwardly into said space, an inner sealing structure adapted to be carried by said inner part in fluid tight relation therewith and extending radially outwardly into said space, each of said structures including at least two annular sealing elements formed of relatively thin flexible metal, each element of one structure having an edge of the same in overlapping sealing engagement with an edge portion of a sealing element of the other structure, the two sealing areas being on different radii, so that on one side of the device the effective fluid pressure area presented by an element extending inwardly of the sealing area is greater than the fluid pressure area presented by the cooperating element extending outwardly from the sealing area, and the overlap being arranged whereby pressure applied to said side of the seal tends to separate the surfaces from sealing engagement, and so that on the other side of the device the sealing element extending outwardly from the sealing area is dimensioned to present a greater fluid pressure area than the cooperating element extending inwardly from the sealing area, and the overlap on that side being arranged whereby fluid pressure applied to said side of the device tends to urge the sealing areas together and whereby fluid pressure exerted between the two sets of annuluses tends to urge the latter sealing areas apart.

3. A sealing device for establishing a fluid tight seal between relatively rotatable inner and outer parts having an annular space therebetween for receiving said sealing device, said sealing device comprising an outer sealing structure adapted to be carried by said outer part in fluid tight relation therewith and extending radially inwardly into said space, an inner sealing structure adapted to be carried by said inner part in fluid tight relation therewith and extending radially outwardly into said space, said structures forming at least two pairs of flexible annuluses disposed in substantially parallel relation and with space therebetween, the elements of each pair being in overlapping relation on an annular sealing area, one annulus of each pair presenting effective fluid pressure areas on each side of the same which are substantially greater than the corresponding effective fluid pressure areas of the other annulus, each of said one annulus of each pair being stressed in the same general direction longitudinally of the axis of the device and the overlap between annuluses of one pair being arranged whereby fluid pressure applied to one side of the assembly serves to urge the annuluses exposed on that side into tighter overlapping engagement, the other pair of annuluses being overlapped in such a manner that fluid pressure applied to that side of the assembly serves to separate the exposed annuluses from engagement.

4. A sealing device as in claim 3 together with an additional annulus disposed in said space and dimensioned to intervene between said overlap sealing areas.

5. A sealing device for establishing a fluid tight seal between relatively rotatable inner and outer parts having an annular space therebetween for receiving said sealing device, said sealing device comprising an outer sealing structure adapted to be carried by said outer part in fluid tight relation therewith and extending radially inwardly into said space, an inner sealing structure adapted to be carried by said inner part in fluid tight relation therewith and extending radially outwardly into said space, such structures forming at least two pairs of annuluses disposed in substantially parallel relation and with a space therebetween, the elements of each pair being in overlap sealing relation on an annular sealing area, one annulus of each pair being formed of relatively thin spring metal stressed laterally within its elastic limit, said one spring metal annulus of each pair presenting effective fluid pressure areas on each side of the same which are substantially greater than the corresponding effective fluid pressure areas of the other annulus, each of said one spring metal annulus of each pair being stressed in the same general direction longitudinally of the axis of the device and the overlap between annuluses of one pair being arranged whereby fluid pressure applied to one side of the assembly serves to urge the annuluses exposed on that side in a tighter overlapping engagement, the other pair of annuluses being overlapped in such a manner that fluid pressure applied to that side of the assembly serves to separate the annuluses exposed on that side from sealing engagement.

LAWRENCE G. SAYWELL.

REFERENCES CITED

The following references are of record in the file of this patent:

UNITED STATES PATENTS

| Number | Name | Date |
|---|---|---|
| 157,791 | Cameron | Dec. 15, 1874 |
| 947,536 | Wenkel | Jan. 25, 1910 |
| 1,626,237 | Hodgkinson | Apr. 26, 1927 |
| 1,803,957 | Bragg | May 5, 1931 |
| 1,895,288 | Larsh | Jan. 24, 1933 |
| 2,151,730 | Basebe et al. | Mar. 28, 1939 |
| 2,251,012 | Delaval-Crow | July 29, 1941 |
| 2,428,041 | Saywell | Sept. 30, 1947 |